US00RE49044E

(19) United States
(12) Reissued Patent
Nelson et al.

(10) Patent Number: US RE49,044 E
(45) Date of Reissued Patent: Apr. 19, 2022

(54) AUTOMATIC AVATAR CREATION

(71) Applicant: Apple Inc., Cupertino, CA (US)

(72) Inventors: Alex Nelson, Portland, OR (US); Cedric Bray, Sunnyvale, CA (US); Thomas Goossens, Paris (FR); Rudolph Van Der Merwe, Portland, OR (US); Richard E. Crandall, Portland, OR (US); Bertrand Serlet, Palo Alto, CA (US)

(73) Assignee: Apple Inc., Cupertino, CA (US)

(21) Appl. No.: 16/147,348

(22) Filed: Sep. 28, 2018

Related U.S. Patent Documents

Reissue of:
(64) Patent No.: 8,692,830
Issued: Apr. 8, 2014
Appl. No.: 12/791,707
Filed: Jun. 1, 2010

U.S. Applications:
(62) Division of application No. 15/092,463, filed on Apr. 6, 2016, now abandoned, which is an application for the reissue of Pat. No. 8,692,830.

(51) Int. Cl.
*G06K 9/00* (2006.01)
*H04N 21/442* (2011.01)

(52) U.S. Cl.
CPC .. *G06K 9/00281* (2013.01); *A63F 2300/5553* (2013.01); *G06K 9/00221* (2013.01); *G06K 9/00268* (2013.01); *G06K 9/00315* (2013.01); *H04N 21/44218* (2013.01)

(58) Field of Classification Search
CPC ..... G06K 9/00281; G06K 9/00208; G06K 9/00268; G06K 9/00221; G06K 9/00315; A63F 2300/5553; G06T 2200/08; H04N 21/44218
USPC ..... 345/473, 581, 582, 649; 348/222.1, 458, 348/537, 581; 382/129; 706/13
See application file for complete search history.

(56) References Cited

U.S. PATENT DOCUMENTS 5,483,261 A 1/1996 Yasutake
5,488,204 A 1/1996 Mead et al.
5,825,352 A 10/1998 Bisset et al.
5,835,079 A 11/1998 Shieh
5,880,411 A 3/1999 Gillespie et al.
(Continued)

FOREIGN PATENT DOCUMENTS

JP 2000-163031 A 6/2000
JP 2002-342033 A 11/2002
(Continued)

OTHER PUBLICATIONS

Non-Final Office Action dated Oct. 31, 2018, for U.S. Appl. No. 15/092,463, filed Apr. 6, 2016, 29 pages.
(Continued)

*Primary Examiner* — Dennis G Bonshock
(74) *Attorney, Agent, or Firm* — Kubota & Basol LLP

(57) ABSTRACT

A three-dimensional ("3D") avatar can be automatically created that resembles the physical appearance of an individual captured in one or more input images or video frames. The avatar can be further customized by the individual in an editing environment and used in various applications, including but not limited to gaming, social networking and video conferencing.

33 Claims, 7 Drawing Sheets

(56) References Cited

U.S. PATENT DOCUMENTS 6,072,496 A * 6/2000 Guenter ..... G06K 9/00201 345/419
6,188,391 B1 2/2001 Seely et al.
6,272,231 B1 * 8/2001 Maurer ..... G06K 9/00228 382/103
6,280,387 B1 * 8/2001 Deforge ..... A61B 8/06 128/916
6,310,610 B1 10/2001 Beaton et al.
6,323,846 B1 11/2001 Westerman et al.
6,545,682 B1 * 4/2003 Ventrella et al. ..... 345/473
6,570,557 B1 5/2003 Westerman et al.
6,677,932 B1 1/2004 Westerman
6,690,387 B2 2/2004 Zimmerman et al.
6,807,290 B2 * 10/2004 Liu ..... G06K 9/00201 375/E7.084
6,873,610 B1 * 3/2005 Noever ..... 370/338
7,006,102 B2 * 2/2006 Rowe ..... H04M 1/576 345/582
7,015,894 B2 3/2006 Morohoshi
7,043,463 B2 5/2006 Bonabeau
7,184,047 B1 2/2007 Crampton
7,184,064 B2 2/2007 Zimmerman et al.
7,515,173 B2 * 4/2009 Zhang ..... H04N 7/144 348/14.01
7,614,008 B2 11/2009 Ording
7,623,687 B2 * 11/2009 Bronstein ..... G06T 17/00 345/419
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,697,960 B2 4/2010 Seo et al.
7,844,914 B2 11/2010 Andre et al.
7,921,066 B2 * 4/2011 Van Dyke Parunak et al. ..... 706/13
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
8,514,262 B2 * 8/2013 Ueno ..... G06K 9/00208 348/14.01
9,348,458 B2 5/2016 Hotelling et al.
9,413,923 B2 * 8/2016 Yamaguchi ..... H04N 1/215
9,671,942 B2 6/2017 Fleury et al.
9,933,937 B2 4/2018 Lemay et al.
2002/0015024 A1 2/2002 Westerman et al.
2003/0110450 A1 6/2003 Sakai
2005/0078804 A1 4/2005 Yomoda
2005/0143108 A1 6/2005 Seo et al.
2005/0190059 A1 9/2005 Wehrenberg
2005/0248574 A1 11/2005 Ashtekar et al.
2006/0017692 A1 1/2006 Wehrenberg et al.
2006/0026521 A1 2/2006 Hotelling et al.
2006/0033724 A1 2/2006 Chaudhri et al.
2006/0072154 A1 * 4/2006 Kim ..... G06F 3/1207 358/1.15
2006/0197753 A1 9/2006 Hotelling
2007/0080967 A1 4/2007 Miller
2007/0188502 A1 * 8/2007 Bishop ..... G06T 13/40 345/473
2007/0298866 A1 12/2007 Gaudiano et al.
2008/0163074 A1 7/2008 Tu
2009/0044113 A1 * 2/2009 Jones ..... G06T 13/40 715/707
2009/0118019 A1 * 5/2009 Perlman ..... A63F 13/12 463/42
2009/0119729 A1 * 5/2009 Periman ..... A63F 13/335 725/114
2009/0147008 A1 6/2009 Do et al.
2009/0175521 A1 * 7/2009 Shadan et al. ..... 382/129
2009/0195650 A1 * 8/2009 Hanai ..... G06T 11/60 348/143
2009/0215533 A1 * 8/2009 Zalewski ..... A63F 13/00 463/32
2010/0007665 A1 * 1/2010 Smith ..... G06T 13/40 345/473
2010/0046806 A1 2/2010 Baughman et al.
2010/0073458 A1 * 3/2010 Pace ..... G06K 9/00261 348/14.16
2010/0157021 A1 * 6/2010 Abraham ..... G06Q 30/06 348/47
2010/0210359 A1 * 8/2010 Krzeslo ..... A63F 13/10 463/31
2010/0240458 A1 * 9/2010 Gaiba ..... A63F 13/10 463/36
2010/0299621 A1 * 11/2010 Piehler ..... H04N 1/00795 715/764
2010/0302395 A1 * 12/2010 Mathe et al. ..... 348/222.1
2011/0025689 A1 * 2/2011 Perez ..... A63F 13/213 345/420
2011/0292051 A1 12/2011 Nelson et al.
2012/0182374 A1 * 7/2012 Matsuda ..... G06F 3/1208 347/225
2013/0071821 A1 * 3/2013 Drmanac ..... G09B 5/06 434/236
2013/0124572 A1 * 5/2013 Lettau ..... G06Q 10/0631 707/798

FOREIGN PATENT DOCUMENTS

KR 10-20020042248 A 6/2002
WO 2013/169849 A2 11/2013
WO 2014/105276 A1 7/2014

OTHER PUBLICATIONS

Final Office Action dated Aug. 8, 2013, for U.S. Appl. No. 12/791,707, filed Jun. 1, 2010, eighteen pages.
Final Office Action dated Jul. 24, 2017 for U.S. Appl. No. 15/092,463, filed Apr. 6, 2016, 24 pages.
Non-Final Office Action dated Mar. 29, 2013 for U.S. Appl. No. 12/791,707, filed Jun. 1, 2010, eighteen pages.
Non-Final Office Action dated Jan. 19, 2017 for U.S. Appl. No. 15/092,463, filed Apr. 6, 2016, 27 pages.
Notice of Allowance dated Dec. 18, 2013 for U.S. Appl. No. 12/791,707, filed Jun. 1, 2010, eleven pages.
"Model Generation for an Instrusion Detection System Using Genetic Algorithms" Chittur, Adhitya, Nov. 27, 2001.*
Amin, Alia K., et al., "The Sense MS: Enriching the SMS experience for Teens by Non-verbal Means", *Human-Computer Interaction—Interact 2005*, IFIP TC13 International Conference Proceedings, Rome, Italy, Sep. 12-16, 2005, pp. 962-965.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

AUTOMATIC AVATAR CREATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 8,692,830. Specifically, this application is a divisional reissue application of U.S. patent application Ser. No. 15/092,463, filed Apr. 6, 2016, which is an application for reissue of U.S. Pat. No. 8,692,830, the entire disclosures of which are incorporated herein by reference for all purposes.*

TECHNICAL FIELD

This disclosure relates generally to avatar creation for computer systems and other devices.

BACKGROUND

Avatars are increasingly used in online social networking, gaming, and other communications, typically as a surrogate for an actual photograph of the user. Avatars offer a measure of privacy, while allowing the user to have control over their online identity. Although users sometimes choose an avatar that is unrelated to their physical appearance, it is often desirable to have the avatar resemble the actual user.

There are several conventional tools for avatar creation and editing. These conventional tools generally allow the user to select from a palette of predefined avatar parts, and in some cases to manually modify the position, shape, or color of these parts. Using these conventional tools to create an avatar that looks like the user can be a time-consuming process that requires some degree of artistic skill.

SUMMARY

A three-dimensional ("3D") avatar can be automatically created that resembles the physical appearance of an individual captured in one or more input images or video frames. The avatar can be further customized by the individual in an editing environment and used in various applications, including but not limited to gaming, social networking and video conferencing.

In some implementations, a space of avatars is searched to find an avatar that most closely approximates the appearance of the individual in the input image. A genetic process can be used to efficiently search the space, and thereby estimate key parameters describing an avatar that resembles the person in the input image. During the genetic process, an individual "genome" can be evaluated by generating an avatar according to parameter values in the individual genome. In some implementations, the individual genome parameterizes a 3D avatar model, which can be rendered on a device using a graphics engine. The 3D model can include an avatar head with adjustable widths at multiple elevations, as well as several mesh models for hair, nose, eyes, mouth, ears, glasses, mustache, etc. Each of these mesh models can be scaled, positioned, and oriented under parametric control. The 3D model can be constrained to keep the facial components attached to the head, and in reasonable locations on the head. The 3D model also can include ambient and directional light sources, and the ability to control the color of the lighting and of the facial components. By rendering the blank avatar head without features, and then applying the facial components one at a time, binary masks can be generated indicating the two dimensional extent of each facial component.

The input image (s) (or video frame) of the individual can be processed to produce binary masks and grayscale images that are specific for the facial elements. An overall fitness can be computed for each avatar in the avatar population by comparing digital representations of rendered avatar facial elements (e.g., binary masks) with digital representations (e.g., binary masks, grayscale images) of facial elements of the individual genome generated from the input image(s).

In some implementations, a computer implemented method includes: receiving one or more digital images of an individual; determining, in a computer, digital representations of facial elements of the individual from the one or more digital images; searching a population of avatars using a genetic process, where the genetic process includes using the computer to evaluate the overall fitness of the avatars using a fitness function that compares the digital representations of the individual's facial elements to digital representations of corresponding avatar facial elements; and selecting, or receiving a selection of, one or more avatars from the population of avatars based on fitness values associated with the avatars.

In some implementations, a system includes one or more processors and a computer-readable storage medium coupled to the one or more processors. The computer-readable storage medium includes instructions. The one or more processors execute the instructions to perform the following operations: receiving one or more digital images of an individual; determining, in a computer, digital representations of facial elements of the individual from the one or more digital images; searching a population of avatars using a genetic process, where the genetic process includes using the computer to evaluate the overall fitness of the avatars using a fitness function that compares the digital representations of the individual's facial elements to digital representations of corresponding avatar facial elements; and selecting or receiving a selection of one or more avatars from the population of avatars based on fitness values associated with the avatars.

The details of one or more implementations of automatic avatar creation are set forth in the accompanying drawings and the description below. Other features, aspects, and advantages of automatic avatar creation will become apparent from the description, the drawings, and the claims.

DETAILED DESCRIPTION

Overview of Genetic Process

Genetic algorithms (GAs) are a class of search algorithms well-suited for searching large spaces. GAs roughly mimic the biological process of evolution to find an individual or population of individuals with the highest possible fitness for a given environment. Borrowing from biological terminology, the set of parameters that defines an individual solution is the genome, and each parameter is a gene. Further, the collection of individuals currently being evaluated is the population, and each iteration in the search is referred to as a generation.

For example, an avatar genome might consist of 30 genes, and the genetic process might maintain a population of 10 genomes at a given time. Starting with an initial population of randomly generated individuals, a GA can iterate over hundreds of generations before converging on a final population. To create a new population from an old population (and so begin a new generation), the old population can be sorted according to the fitness of the individuals. Next, parents are selected from the population, with the probability of being selected as a parent being proportional to the individual's fitness, the individual's rank in the population, or some other metric. The selected parents are grouped (typically in pairs) to produce the children that make up the new population. In some implementations, some number of the best parents are added to this population and compete with their children; this is called an elitist strategy, and ensures that the maximal fitness value of the GA monotonically increases as a function of the generation. For example, the best individual of each generation is as good or better than the best individual of the previous generation. The GA can iterate until a maximum number of generations is reached, or until some termination condition is satisfied.

Automatic Avatar Creation—Overview

Figure 1:
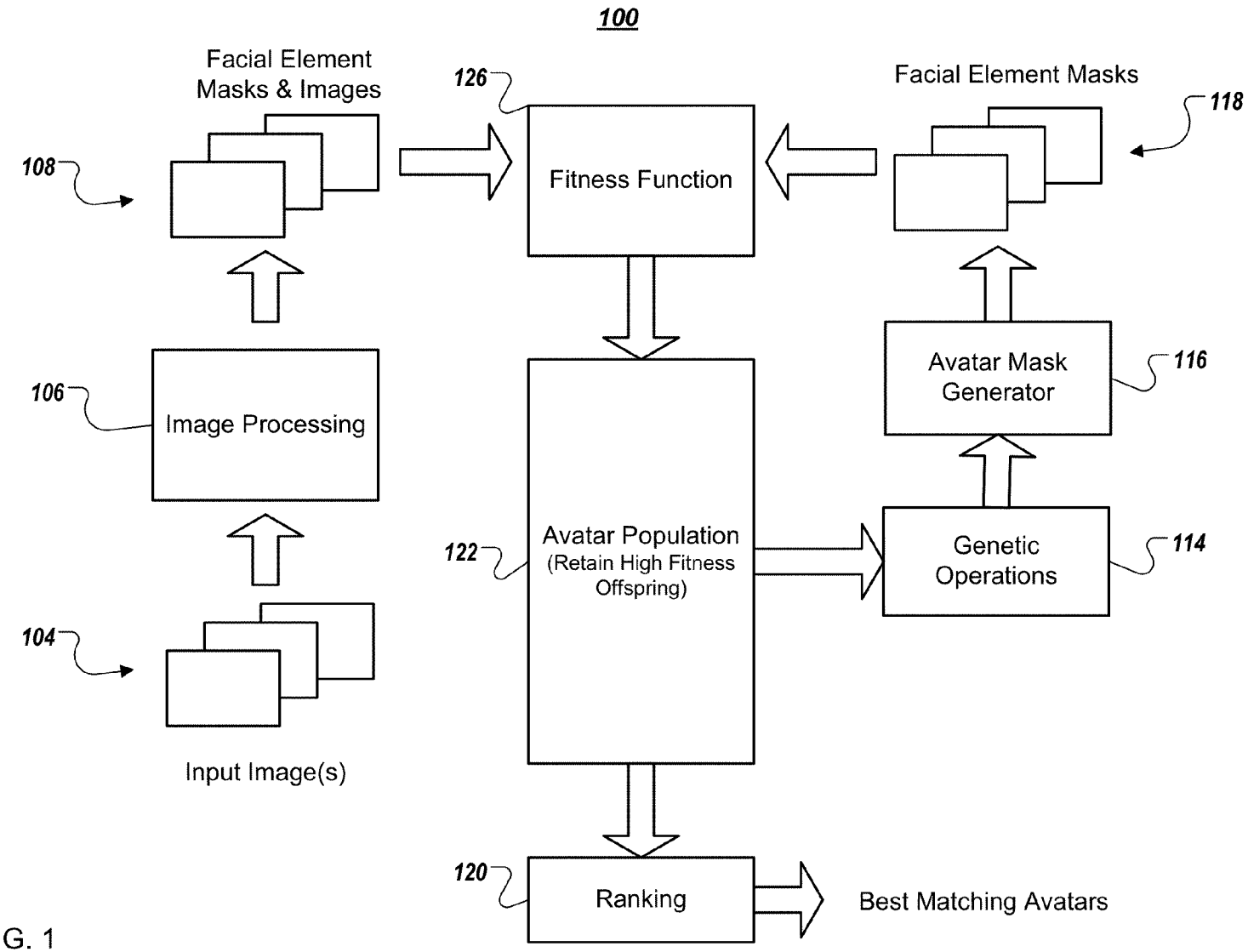
FIG. 1 illustrates an exemplary system for automatic avatar creation using a genetic process.

FIG. 1 illustrates an exemplary system 100 for automatic avatar creation using a genetic process. In some implementations, an individual genome can be evaluated by generating digital representations of avatar facial elements 118 from an avatar population. The digital representations can include a color avatar image, as well as binary masks for individual facial elements. One or more input images 104 of an individual can be captured by digital image capture device (e.g., a digital camera, webcam, video camera). Image processing 106 can be performed on the one or more input images 104 to produce digital representations 108 of the individual's facial elements (e.g., binary masks and grayscale images). Some examples of facial elements include but are not limited to: face (skin), eyebrows, eyes, nose, mouth, chin, hair, bears, ears, etc.

The fitness of individual avatars can be evaluated using fitness function 126, which compares digital representations 108 of an individual's facial elements with digital representations 118 of corresponding avatar facial elements. The comparison can be performed using two different logical operations: a pixel-wise XOR operation and a pixel-wise AND operation. The AND operation can be used for measuring the alignment of edges of facial elements and the XOR operation can be used for measuring the area of non-overlap between digital representations 108 and digital representations 118. Fitness function 126 can be used to retain high fitness offspring in avatar population 122 by replacing less fit avatars in avatar population 122 with new avatars or offspring. Genetic operations 114 (e.g., crossover, mutation) can be used to generate new facial elements for the avatar population. Avatar mask generator 116 can generate new digital representations 118 from the new facial elements, which can be evaluated by fitness function 126. The foregoing genetic process repeats until a termination condition is met. When the termination condition is met, the avatars in avatar population 122 can be ranked or sorted according to their overall fitness as determined by fitness function 126. One or more of the avatars can be selected for presentation (e.g., as a grid display) to a user (e.g., the individual) for manual selection in a computing environment (e.g., in a game environment, chat session, avatar editor, etc.)

First Stage Image Processing of Input Images

Figure 2:
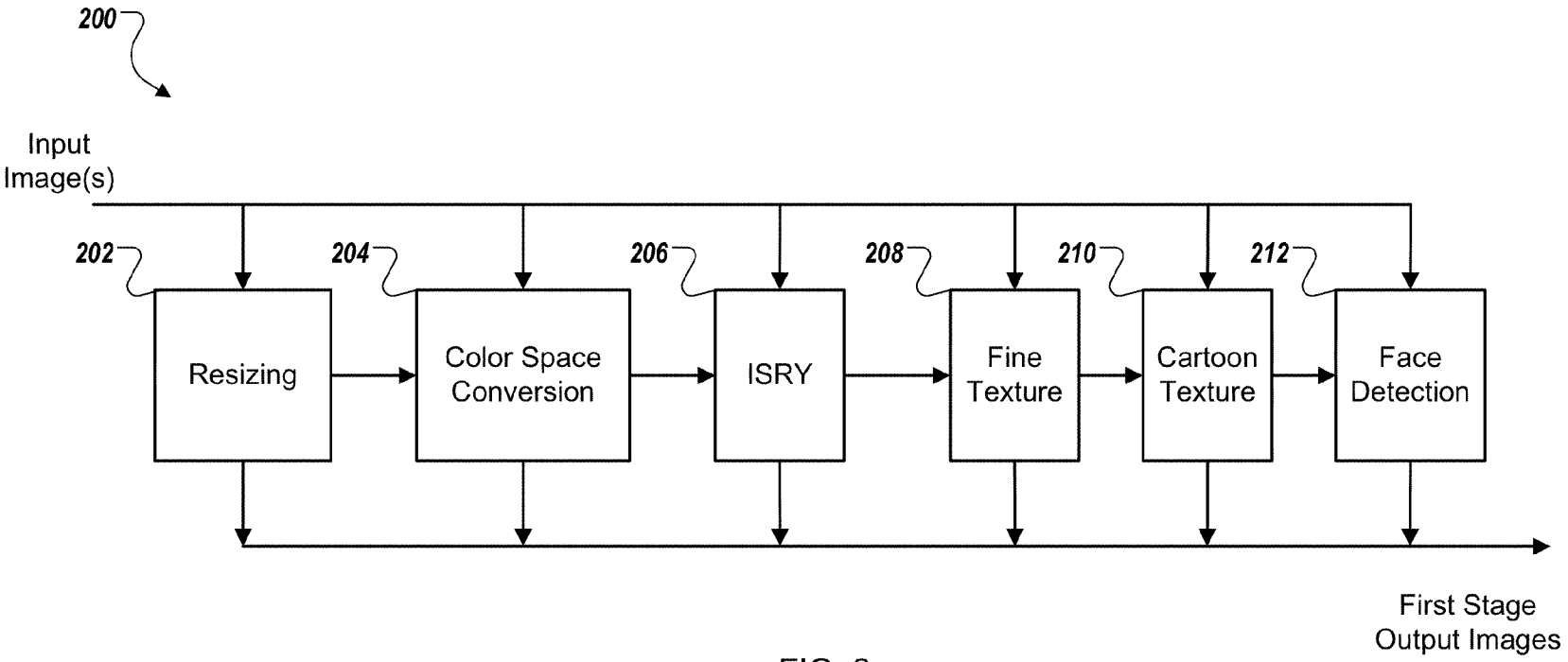
FIG. 2 is a flow diagram of an exemplary preprocessing of input images for automatic avatar creation.

FIG. 2 is a flow diagram of an exemplary preprocessing of input images 104 for automatic avatar creation. Image processing 106 can be divided into two stages. In first stage 200, input image 104 can be preprocessed and resulting output images can be used by various facial element-specific image processing modules in second stage 300, as described in reference to FIG. 3. In some implementations, first stage 200 can include the following image processing modules: resizing 202, color space conversion 204, inverted square root y channel (ISRY) 206, fine texture 208, cartoon texture 210 and face detection 212. All or some of the processing modules in first stage 200 can be applied to input image 104 to prepare input image 104 for further processing in second stage 300. Each of the processing modules in first stage 200 will now be discussed in turn.

Resizing

Input image 104 can be processed by resizing module 202, which can downsampled input image 104 to a lower resolution. Downsampling improves the speed of subsequent processing in second stage 300. Additionally, in some cases downsampling can also act as a lowpass anti-aliasing filter on input image 104.

Color Space Conversion

Input image 104 can be processed by color space conversion module 204, which can convert input image 104 from a first color space to a second color space. For example, converting input image 104 from Red, Green, Blue (RGB) color space to Hue, Saturation, Value (HSV) color space would allow hue to be operated by image processing modules in second stage 300.

Inverted Square Root Y Channel (ISRY)

Input image 104 can be processed by ISRY module 206, which converts input image 104 to an intensity channel of Y'UV color space, followed by an operation 1−sqrt(Y), which has the effect of boosting lower intensity signals. The result is then inverted so that dark areas in input image 104 are the brightest areas in a grayscale image.

Fine Texture

Fine texture module 208 performs several steps on input image 104. First, homomorphic filtering is applied to remove lower spatial frequencies (e.g., only variations over a few pixels are preserved). Next a standard deviation image is generated by replacing each pixel in input image 104 by the square root of the average of the squared difference between that pixel and the other 8 pixels adjacent to that pixel. This resulting image is bright only where there is fine texture or detail.

Cartoon Texture

Cartoon texture module 210 can perform a combined downsample-upsample operation. The downsample operation use a conventional downsample process, and the upsample can be a spline-based process. The resulting image is a cartoon effect, where fine details are lost and the sharpness of large edges is maintained.

Face Detection

Face detection module 212 determines an approximate center, width and height of an individual's face captured in input image 104 using a face detector process (e.g., Open CV face detector).

Second Stage Processing of Input Images

Figure 3:
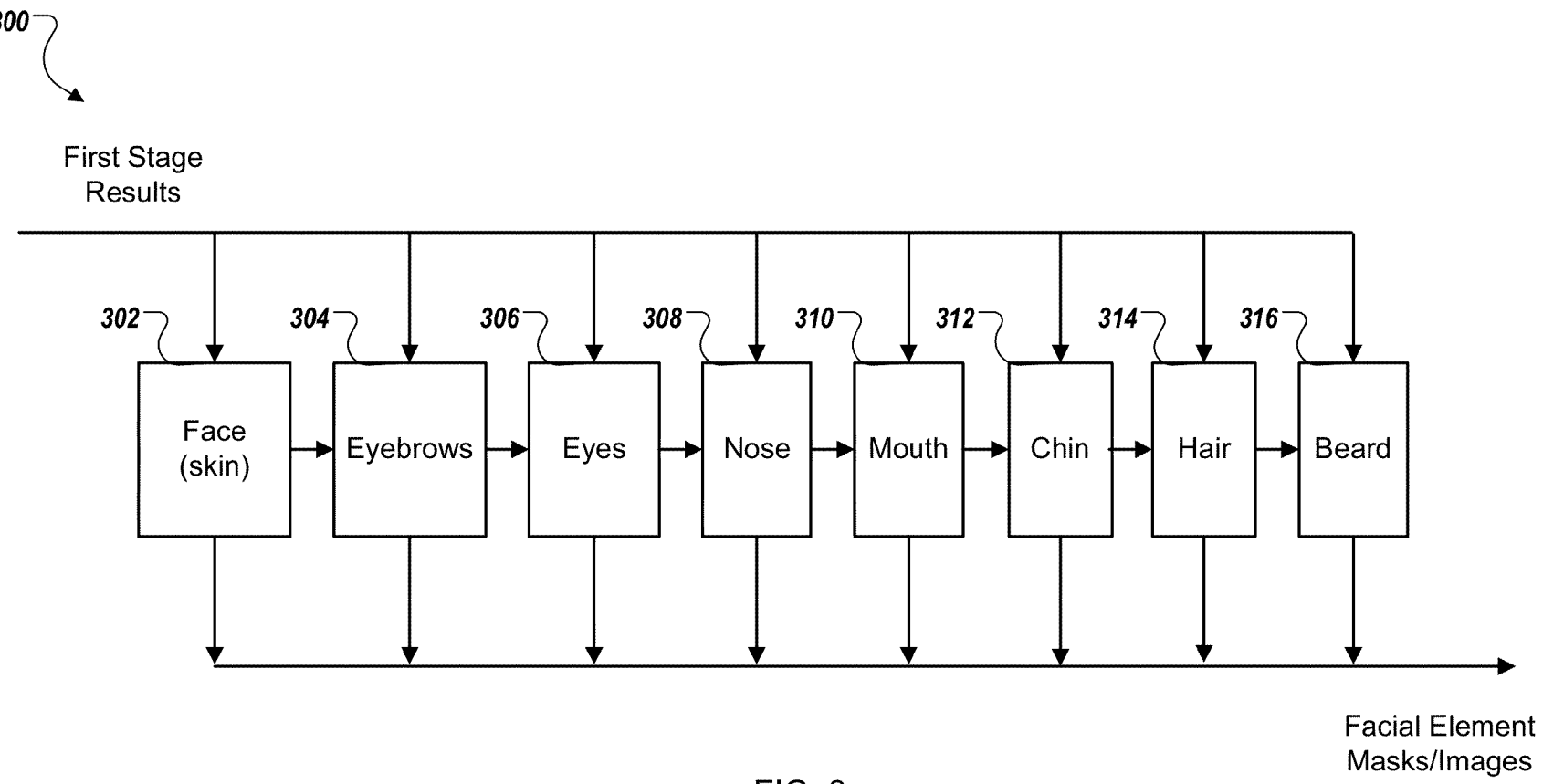
FIG. 3 is a flow diagram of an exemplary facial element processing stage for automatic avatar creation.

FIG. 3 is a flow diagram of an exemplary second stage 300 of image processing 106. In second stage 300, image processing modules are applied to output images generated in first stage 200 to produce digital representations of facial elements of the individual genome (e.g., binary masks, grayscale images). Each of the processing modules in second stage 300 will now be discussed in turn.

Face Mask

Face mask module 302 can use a linear discriminant analysis (LDA) classifier that is built from two sets of data: (1) data from a rectangular region in the center of the image, and (2) data from the periphery of the image. For each pixel of image, an input can be vector generated that contains RGB and HSV values for that pixel. The H or hue value can be rotated to avoid a discontinuity in the red range of the color space. A second-order statistics of the vectors in the two datasets can be used to determine a hyperplane, which separates two classes: class-1 and class-2. The image can then be classified with this hyperplane to produce a binary image where white pixels belong to class-1 and black pixels belong to class-2. The white pixels or class-1 define the face skin.

Eyebrows Mask

Eyebrows mask module 304 can use the ISRY image output from ISRY module 206 in first stage 200 with two edge detectors: one horizontal and one vertical. An output image can be prepared, which can be black for pixels with a horizontal edge value below a threshold tH, or vertical edge value above another threshold tV. The remaining pixels can have nonzero values given by $$\frac{1}{(1+\exp(w*(tV-pV)))}*\frac{1}{(1+\exp(-w*(tH-pH)))}, \quad (1)$$

where pH and pV are the horizontal and vertical edge values for the pixel, respectively.

Eyes Mask

Eyes mask module 306 can use a weighted average of the output image of ISRY module 206 of first stage 200 and output image cartoon texture module 210 of first stage 200. The result can then processed as $$\frac{\max(0, p-k)}{(1-k)},$$

which reduces all intensities by k, and rescales to increase the dynamic range, where p is a pixel value. Next, pixels outside of a rectangular region around the eyes (roughly determined from the output image of face detector module 212) can be set to black. This image can then be converted to a binary image by applying a threshold at some fixed percentage between minimum and maximum pixel values.

Nose Image

Nose module 308 can mask the horizontal edge detected RGB image to leave a rectangular region of nonzero pixels around the tip of the nose, as determined from the output image of face detector module 212.

Mouth Mask

Mouth mask module 310 can use an the output image from color space conversion module 204 to generate a mouth mask. In some implementations, an HSV image is used with the H channel modified to produce large values for colors near red. The modified H channel can be multiplied with the S channel to produce a grayscale image, which can be bright in regions that contain saturated colors near red. This image can be multiplied with the horizontal edge detector result on the RGB image, masked to zero-out all but a rectangular area around the mouth (e.g., as roughly determined by the output of face detector module 212) and then thresholded to produce a binary image. A connected components analysis can be performed on the binary image to identify the largest contiguous collection of white pixels. A morphological closing operation can be performed on the binary image (e.g., dilation followed by erosion filters) to fill in gaps.

Chin Image

Chin Image module 312 can mask the horizontal edge detected RGB image to leave a rectangular region of nonzero pixels around the bottom of the chin (e.g., as determined from the output of face detector module 212). The results can be masked further by a morphological closing of the skin mask, leaving only edges that are within the skin regions. The final grayscale image can be amplified by a gain factor to increase contrast.

Hair Mask

Hair mask module 314 can use several output images from first stage 200. The output image from cartoon texture image module 210 can be thresholded to produce a binary mask (Mask-A) for the hair regions using the output of the face detector module 210 to isolate the head. The output image from fine texture module 208 can be thresholded to produce a binary mask (Mask-B) of all high-texture pixels.

The RGB image can be modified by converting the image to Y'UV color space, replacing the Y channel with 0.6*sqrt (Y), and then converting back to RGB colorspace. This process increases the dynamic range of dark areas and diminishes the overall intensity in the image, making color more dominant. The alpha channel of this image can be replaced by an output image of cartoon texture module 210, so that most areas are transparent, except for areas with textures such as the hair and eyes. After completion of the foregoing process, each pixel in the resulting image (Image-A) now contains both color and texture information. Next, the statistics of pixels in Image-A over the area in Mask-A, and also compute the statistics for pixels in Mask-B. These two sets of statistics can be combined to classify an Image-A pixel as belonging to a hair-class or other-class.

A binary image can be produced for the hair-class pixels (Mask-C). Mask-C can then be processed by a morphological closing operation to fill in gaps (Mask-D). Mask-D can be used to generate an LDA classification (e.g., the mask denotes the in-class pixels) using the same LDA classifier design used for skin detection, described in reference to FIG. 2. The LDA classification can be refined by removing pixels that are also classified as skin. A morphological opening operation can be used to remove isolated pixels, and a morphological closing operation can be used to fill in the gaps (Mask-E).

Finally, a connected components analysis can be performed on Mask-E to retain a contiguous pixel group with a shortest average distance to the centroid of Mask-D. Mask-E can be combined via a logical OR operation with Mask-D to produce the final desired mask.

Beard Mask

Beard mask module 316 can threshold the output image of cartoon texture module 210, and a trapezoidal region around the chin (e.g., determined by face detector module 212) is retained.

Genetic Process—Overview

Figure 4:
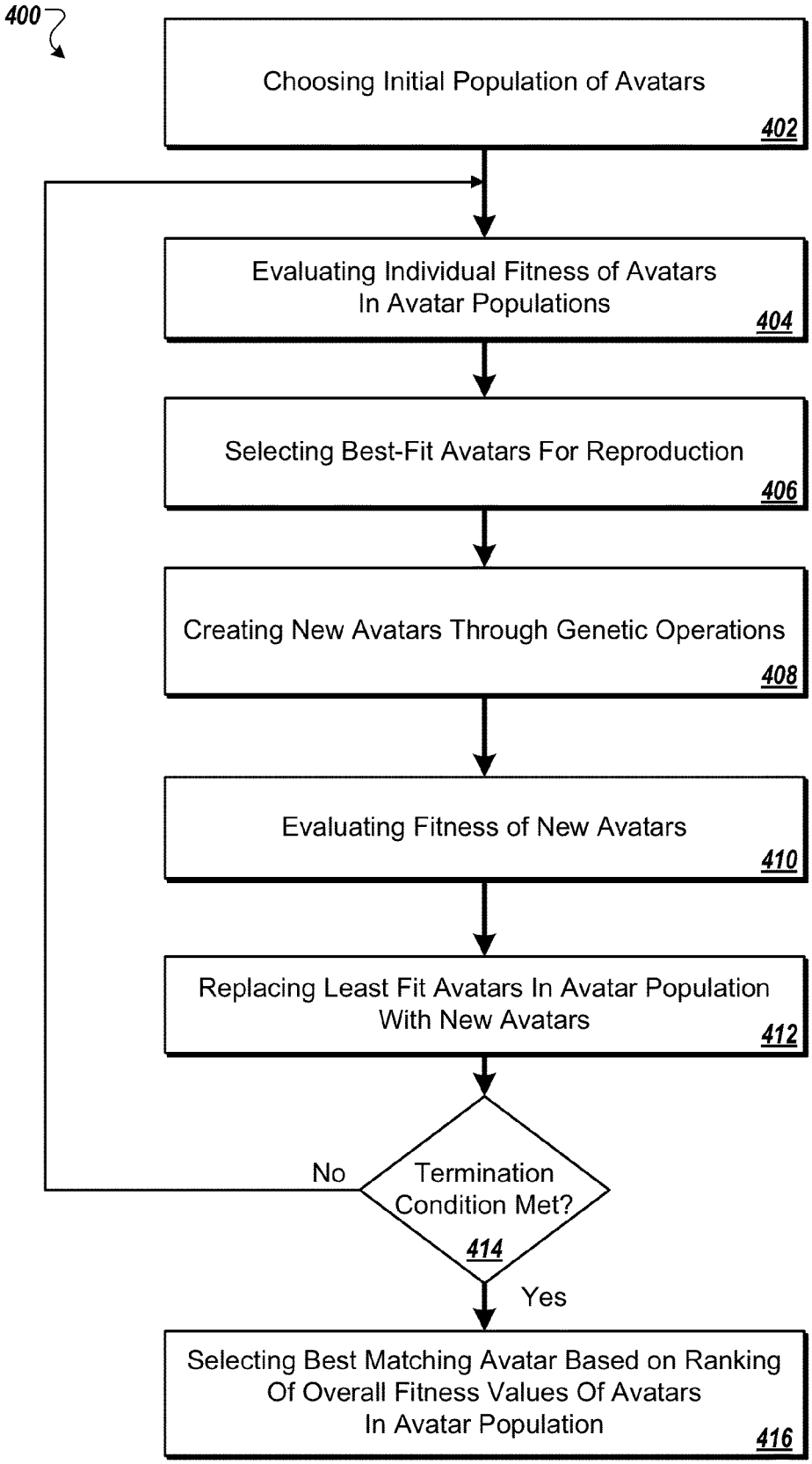
FIG. 4 is a flow diagram of an exemplary genetic process for automatic avatar creation.

FIG. 4 is a flow diagram of an exemplary genetic process 400 for automatic avatar creation. In some implementations, process 400 can be implemented by system 100 shown in FIG. 1.

Referring to FIGS. 1 and 4, process 400 can begin by choosing an initial population of avatars (402). The initial population of avatars can be generated randomly. The avatar population size can be selected to cover a desired comparison space. In some implementations, the avatar population can be "seeded" with avatars that are selected to provide optimal solutions.

After the initial avatar population is created, the individual fitness of each avatar in the initial avatar population is evaluated (404). The evaluation can be accomplished using a fitness function. For example, the fitness of individual avatars can be evaluated by comparing digital representations of the individual's facial elements from input image(s) with digital representations of facial elements of avatars in the avatar population. The comparison can be performed using two different logical operations: a pixel-wise XOR operation and a pixel-wise AND operation. The AND operation can be used for measuring the alignment of edges of facial elements and the XOR operation can be used for measuring the area of non-overlap between the digital representations. One or more pairs of best-fit avatars (based on an overall fitness value obtained from the fitness function) can be selected for reproduction (406). New avatars can be created through genetic operations (e.g., crossover, mutation) on the pair(s) of avatars selected for reproduction (408). Crossover involves randomly selecting a contiguous group of genes within the new genome, and replacing those genes with the corresponding genes from one of the parents genomes. In this way, a new genome can be constructed from randomly chosen sections of the genomes of both parents. Mutation of the newly created genome can be performed by randomly selecting individual genes, and randomly changing the value of those genes.

The individual fitness of the new avatars (offspring) are evaluated (410). The evaluation can be accomplished using the same fitness function as used with the initial avatar population. A number of least fit avatars (based on a ranking or sorting of overall fitness values) in the avatar population can be replaced by the new avatars (412). The number of replaced avatars can be a fixed number or fixed percentage of the current avatar population. If a termination condition is met (414), a best matching avatar or set of avatars can be selected from the current avatar population based on a ranking or sorting of overall fitness values of the avatars in the current avatar generation (416).

If the termination condition is not met (414), process 400 can return to step 404 and repeated from step 404 until the termination condition is met. Some examples of terminating conditions include but are not limited to: (i) an avatar is found that satisfies some minimum criteria; (ii) a fixed number of generations is reached; (iii) the highest ranking avatar is reaching or has reached a plateau such that successive iterations no longer produce better results; (iv) manual inspection; or (v) combinations of the above.

In some implementations, process 400 can be run multiple times on the same input image, and the avatar with the highest overall fitness value can be selected. Alternatively, the individual can be presented with a small selection of the best avatars to choose from. For example, a grid of candidate avatars can be displayed to the individual on a display of a device (e.g., a personal computer, mobile phone, electronic pad, etc.), and the individual can manually select the avatar with the closest resemblance (e.g., using touch input with a finger or stylus).

Generating Individual Facial Element Fitness Values

As described above, the overall fitness of an individual genome can be computed by comparing masks produced from facial elements of avatars in the avatar population against masks and images produced from input images containing an image of an individual whose genome is being matched to an avatar. As described below, this comparison can be performed separately on various facial elements to produce a fitness value (e.g., a value between 0 and 1) for each facial element.

Face Fitness Value

Avatar masks for face and ears can be added together and a mask for the avatar hair can be subtracted from the result. The resulting mask can be compared against the input face mask (computed in second stage 300) using a pixel-wise exclusive- or operation (XOR) to identify regions in either mask, which do not overlap the other mask. The resulting XOR mask can be averaged to produce a scalar error value, $\in_{face}$. The face fitness can be computed as max (0, $1-g_{face}*\in_{face}$), where $g_{face}$ is a constant gain.

Eyebrow Fitness Value

The XOR of the eyebrows masks from the avatar and from the input image can be averaged to produce a scalar error value, $\in_{eyebrow}$. The eyebrow fitness value can be computed as max(0, $1-g_{eyebrow}*\in_{eyebrow}$ is a constant gain.

Eyes and Glasses Fitness Value

The avatar eyeglasses mask can be edge-detected to produce a mask of just the frames. This mask can be added to the avatar eyes mask, and the result XORed with the eyes mask from the input image. The XOR image can be averaged to produce a scalar error value, $\in_{eyes}$. The eyes and glasses fitness value can be computed as max(0, $1-g_{eyes}*\in_{eyes}$), where $g_{eyes}$ is a constant gain.

Nose Fitness Value

The avatar nose mask can be edge-detected, and trimmed to include only the lower portion; additional trimming removes any area below the top of the avatar's mouth or above the bottom of the avatar's glasses or eyes. The trimmed nose mask can be compared with the nose image output from nose module 308 (which can be a grayscale image) using a pixelwise multiplication (analogous to a logical AND operation). The resulting image can be averaged over only the nonzero pixels to produce a scalar fitness value.

Mouth Fitness Value

The XOR of the mouth masks from the avatar and from the input image can be averaged to produce a scalar error value, $\in_{mouth}$. The mouth fitness value can be computed as $\max(0, 1-g_{mouth}*\in_{mouth})$, where $g_{mouth}$ is a constant gain.

Hair Fitness Value

The XOR of the hair masks from the avatar and the output from hair module 314 can be averaged to produce a scalar error value, $\in_{beard}$. The hair fitness value can be computed as $\max(0, 1-g_{hair}*\in_{hair})$, where $g_{hair}$ is a constant gain.

Beard Fitness Value

The XOR of the beard masks from the avatar and the output from beard module 316 can be averaged to produce as scalar error value, $\in_{beard}$. The beard fitness value can be computed as $\max(0, 1-g_{beard}*\in_{beard})$, where $g_{beard}$ is a constant gain.

Chin Fitness Value

The avatar face mask can be edge detected and trimmed to retain only the chin area. As with the nose fitness, this mask can be multiplied with the chin image from the input. The product image is summed over only the nonzero pixels, and divided by a constant fraction of the image width to provide a normalization fitness value that does not penalize larger chins.

Once the fitness values for the facial elements are computed, an overall fitness of the genome can be computed as a function of the individual facial element fitness values. Denoting the above individual facial element fitness values as $f_i$, an overall fitness function can be computed as:

$$f = \sum_i \alpha_i \cdot f_i^{\gamma_i}, \tag{2}$$

where $\alpha_i$ and $\gamma_i$ are linear and geometric weights for each facial element fitness value, respectively, and i is an index into the facial elements. The overall fitness function (2) can be used as fitness function 126 in system 100, as described in reference to FIG. 1.

Exemplary Device Architecture

Figure 5:
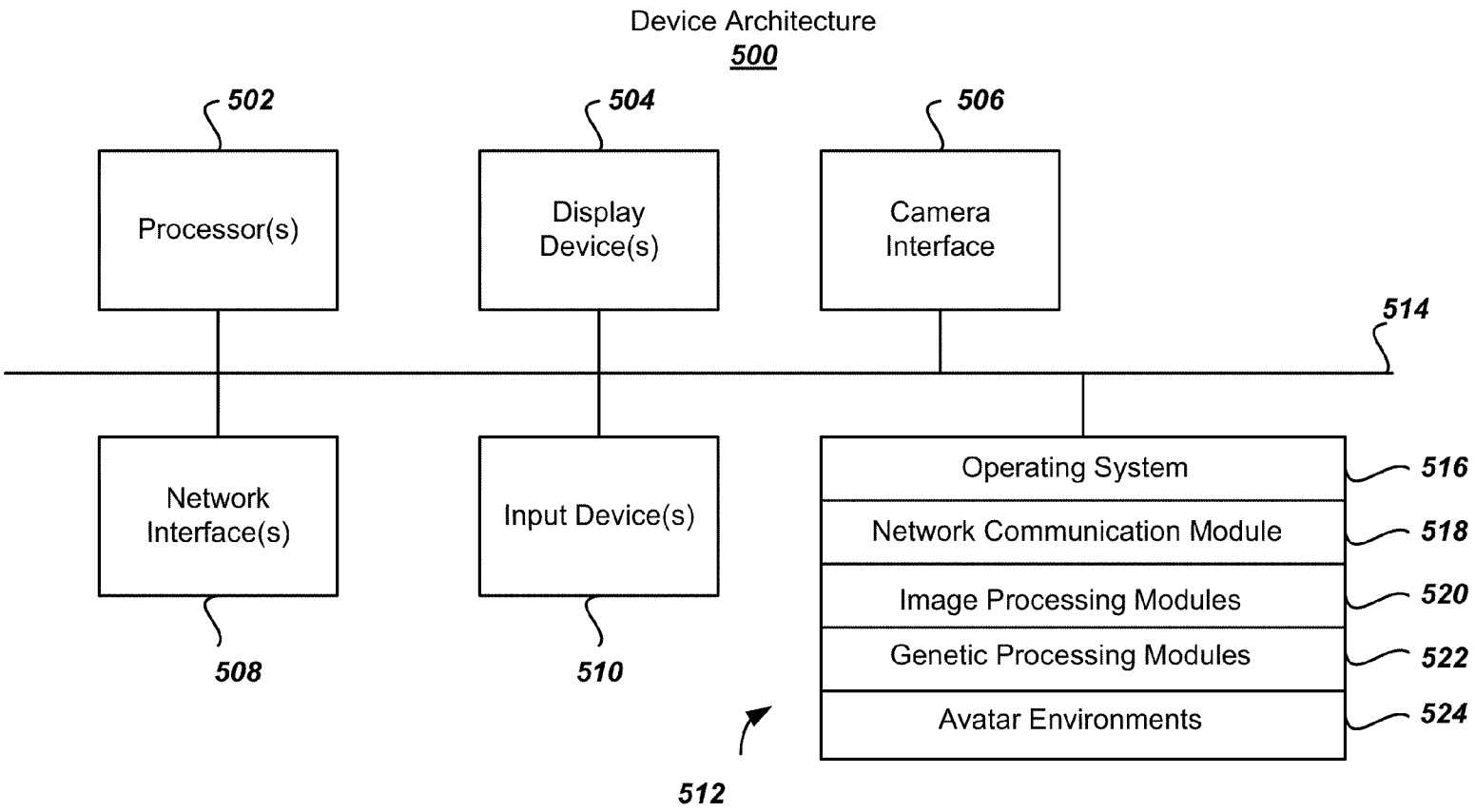
FIG. 5 is a block diagram of an exemplary device architecture for automatic avatar creation.

FIG. 5 is a block diagram of an exemplary device architecture 500 for automatic avatar creation. The architecture 500 includes one or more processors or processing cores 502 (e.g., PowerPC®, Intel Pentium® or Duo Core, etc.), one or more display devices 504 (e.g., CRT, LCD), a camera interface 506 (e.g., USB), a network interface 508 (e.g., Ethernet), input devices 510 (e.g., keyboard, mouse, etc.), and one or more computer-readable mediums 512 (e.g., RAM, ROM, SDRAM, hard disk, optical disk, flash memory, L1 and L2 cache, etc.). These components exchange communications and data via one or more buses 514 (e.g., EISA, PCI, PCI Express, etc.). In some implementations, one or more displays can be touch sensitive displays or surfaces responsive to multi-touch input (e.g., gesture input).

The term "computer-readable medium" refers to any medium that participates in providing instructions to a processor 502 for execution, including without limitation, non-volatile media (e.g., optical or magnetic disks) and volatile media (e.g., memory).

The computer-readable medium 512 further includes instructions, which when executed by processor(s) 502, implements an operating system 516 (e.g., Mac OS®, Windows®, Linux, etc.), a network communication module 518, image processing modules 520, genetic processing modules 522 and one or more avatar environments 524. The operating system 516 can be multi-user, multiprocessing, multitasking, multithreading, real-time and the like. The operating system 516 performs basic tasks, including but not limited to: recognizing input from input devices 510; sending output to display devices 504; keeping track of files and directories on computer-readable mediums 512 (e.g., memory or a storage device); controlling peripheral devices (e.g., disk drives, printers, camera interface 506, etc.); and managing traffic on the one or more buses 514. The network communications module 518 includes various components for establishing and maintaining network connections (e.g., software for implementing communication protocols, such as TCP/IP, HTTP, Ethernet, etc.). The image processing modules 520 enables the features and processes described in reference to FIGS. 2 and 3. The genetic processing modules 522 enables the features and processes described in reference to FIGS. 1 and 4. One or more avatar environments 524 can include an editing environment and/or an application, including but not limited to gaming, social networking, video conferencing or any other application where an avatar can be used.

Exemplary Operating Environment

Figure 6:
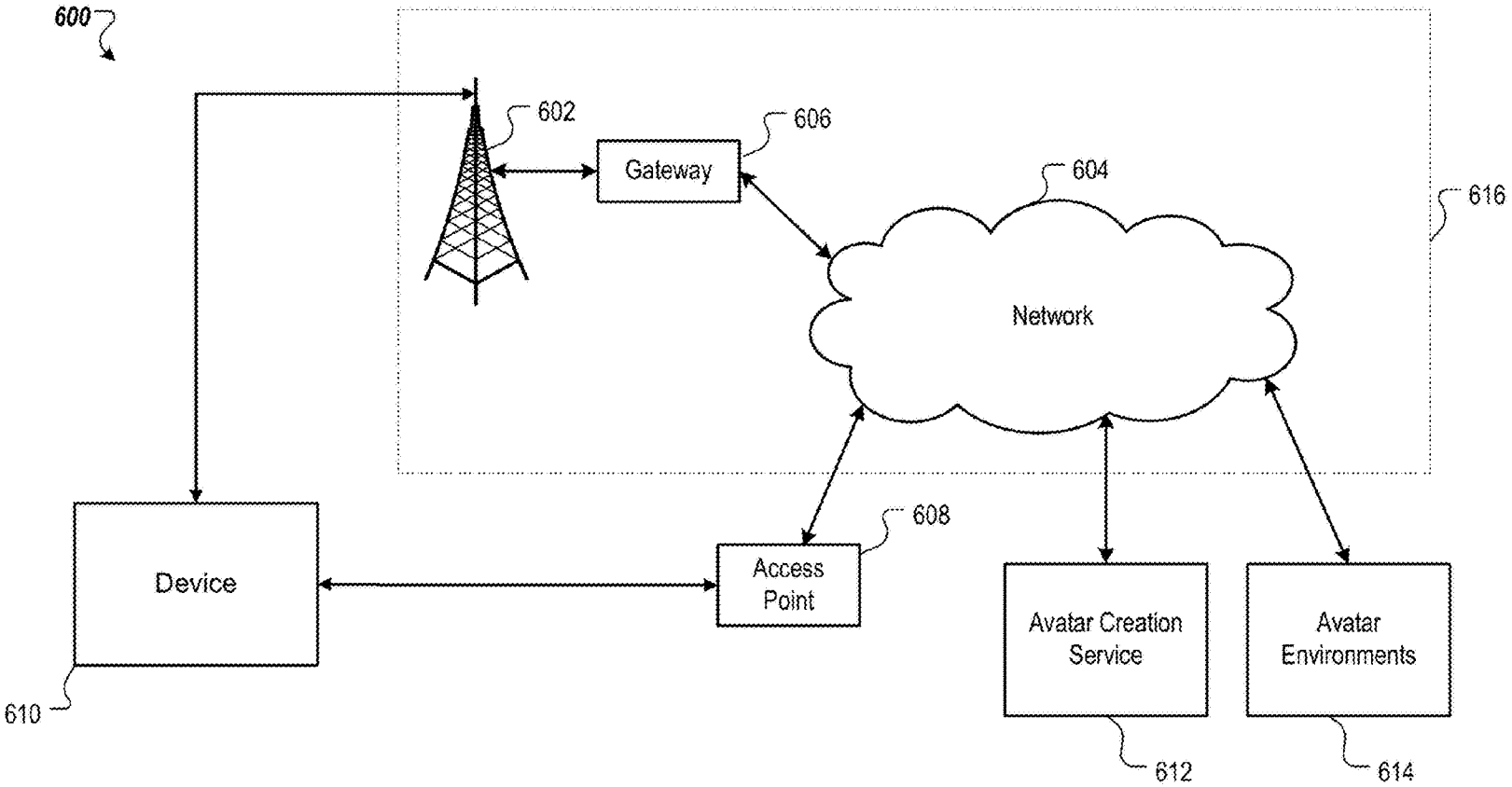
FIG. 6 illustrates an example network operating environment for a device that automatically creates avatars.

FIG. 6 illustrates an example network operating environment 600 for a device 610 that automatically creates avatars. In some implementations, device 610 can communicate over one or more wired and/or wireless networks 616. For example, wireless network 602 (e.g., a cellular network) can communicate with wide area network 604 (e.g., the Internet) by use of gateway 606. Likewise, access point 608 (e.g., an 802.11 wireless access point) can provide communication access to network 604. In some implementations, both voice and data communications can be established over wireless network 602 and access point 608. For example, device 610 can place and receive phone calls (e.g., using VoIP protocols), send and receive e-mail messages (e.g., using POP3 protocol), and retrieve electronic documents and/or streams, such as web pages, photographs, and videos, over wireless network 602, gateway 606, and network 604 (e.g., using TCP/IP or UDP protocols). Likewise, device 610 can place and receive phone calls, send and receive e-mail messages, and retrieve electronic documents over access point 608 and network 604. In some implementations, device 610 can be physically connected to access point 608 using one or more cables and access point 608 can be a personal computer. In this configuration, device 610 can be referred to as a "tethered" device.

Device 610 can also establish communications by other means. For example, device 610 can communicate with other devices, e.g., other wireless devices, cell phones, etc., over wireless network 602. Likewise, device 610 can establish peer-to-peer communications, e.g., a personal area network, by use of one or more communication subsystems, such as a Bluetooth™ communication device. Other communication protocols and topologies can also be implemented.

Device 610 can communicate with one or more services over the one or more wired and/or wireless networks 616. For example, device can communicate with avatar creation service 612, which can provide the features and process described in reference to FIGS. 1-4. Another example service can be an avatar environment service 614. Avatar environment service can provide various environments where an avatar can be used (e.g., an avatar editing environment, a game center for online gaming).

Exemplary User Interface Workflows

A user interface can be used to grab visual data, monitor the progress of the genetic process and display a resulting 3D avatar model. In some implementations, a user interface can be configured to capture live video to allow for a progressive display of genetic process results. For example, a real-time work flow can include grabbing video input and running the genetic process iterations at the same time. The successive video frames can be submitted to the genetic process to refine the search for the best matching avatar model.

In some implementations, an automatic avatar generator application can be run on a device (e.g., a personal computer, mobile phone) as a stand alone application or can be a service (e.g., a library function) accessible through an Application Programming Interface (API). An automatic avatar generator can also be accessed through a network service, where user interfaces are presented as web pages by a remote server computer.

Figure 7:
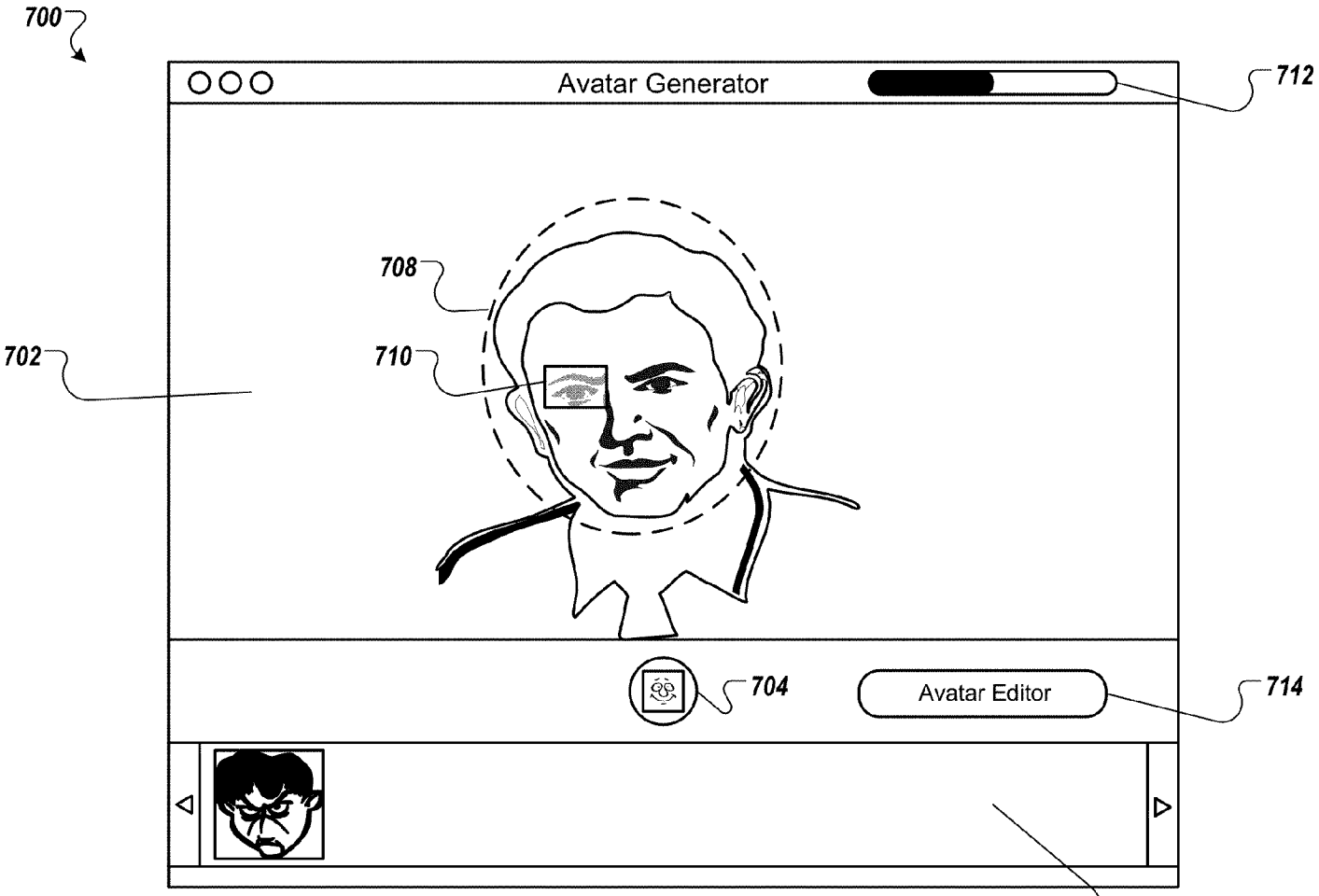
FIG. 7 illustrates an exemplary user interface for an automatic avatar generator.

FIG. 7 illustrates an exemplary user interface 700 for an automatic avatar generator. User interface 700 can include a video preview window 702 for viewing live video captured by a digital capture device (e.g., a web cam). A button 704 or other user interface element can be used to trigger automatic avatar generation. An results panel 706 can be included for displaying candidate avatars that best match the user's physical appearance or genome.

In a real-time workflow, video preview window 702 can be augmented with the latest best 3D avatar model found by the avatar generator. While checking the 3D avatar model rendered over video preview window 702 with alpha transparency, the user can make the head posture vary in the successive frames submitted to the genetic process. To improve the matching performed by the genetic process fitness function, visual marker 708 can be inserted into video preview window 702. In a sequential workflow, visual marker 708 can constrain the user posture. For example, a head guide can be used during the image capture step to constrain the position of the user's head while successive images are captured during the genetic process. In a real-time workflow, moving marker 710 can be included in video preview window 702 for providing visual feedback to the user about the facial elements that are currently being evaluated by the genetic process fitness function. For example, a semi-transparent rectangle can be overlaid on the user's right eye to indicate that the right eye is currently being processed by the fitness function of the genetic process. When the eye processing is completed, the moving marker 710 can be overlaid on the next facial element to be processed (e.g., overlaid on the user's mouth). Progress indicator 712 (e.g., a bar) can visually indicate to the user the progress of the genetic process.

In a sequential workflow, a progress panel (not shown) can replace video preview window 702 once the avatar generation starts. If the input is a picture or a set of pictures, the picture or pictures can remain visible in the progress panel until the genetic processes terminates. Intermediate avatar results can appear as semi-transparent images over each picture. If the input is a video sequence, the video sequence can be played in a loop mode until the genetic process terminates. During each loop, the 3D avatar model obtained from a previous genetic process iteration can be rendered over the video in accordance with the estimated head view angle at each frame. The playback speed can be adjusted automatically to match the average computation time of one genetic process iteration.

In a real-time workflow, the successive 3D avatar models can be shown as transparent overlays over video preview window 702, similar to the sequential workflow for a video. In the real-time workflow, however, the user can decide to stop the evaluation manually at any time if the 3D avatar model looks satisfactory. For that purpose, the real-time genetic process can have a "stop" button and an associated keyboard shortcut.

Both sequential and real-time workflows can generate candidate avatar models that are presented in results panel 706. Alternatively, results panel 706 can replace video preview window 702 once the video images have been captured. Depending on the refinements of the genetic process implementation, there can be one or more possible candidate avatar models that best match the user's physical appearance for a given input image or video sequence. In the case of a single best match, results panel 706 can contain the avatar as a animated 3D model. Optionally, the avatar model can be refined manually using an avatar editor interface, such as the interfaces described in U.S. Provisional Patent Application No. 61/321,840, for "Avatar Editing Environment," filed Apr. 7, 2010.

If multiple candidate avatar models are produced by the genetic process, the candidate avatar models (e.g., thumbnails of front-facing headshots) can be arranged on a grid layout in results panel 706. The user can then choose a preferred candidate avatar model in results panel 706 by clicking or touching on it. In some implementations, panel 706 can replace video preview window 702. In such an implementation, a zoom animation can enlarge the selected avatar model so that it occupies a large size version of the results panel 706. The avatar editor can be entered automatically upon selection of the candidate Avatar from results panel 706, or by clicking or touching button 714.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, e.g., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal), that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube), LCD (liquid crystal display) monitor, touch sensitive device or display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the flow diagrams depicted in the figures do not require the particular order shown, or sequential order, to achieve desirable results. In addition, other steps may be provided, or steps may be eliminated, from the described flow diagrams, and other components may be added to, or removed from, the described systems. Accordingly, various modifications may be made to the disclosed implementations and still be within the scope of the following claims.

What is claimed is:

[1. A computer implemented method, comprising:

receiving one or more digital images of an individual;

determining, in a computer, digital representations of facial elements of the individual from the one or more digital images;

searching a population of avatars using a genetic process, where the genetic process includes using the computer to evaluate the overall fitness of the avatars using a fitness function that compares the digital representations of the individual's facial elements to digital representations of corresponding avatar facial elements; and selecting or receiving a selection of one or more avatars from the population of avatars based on fitness values associated with the avatars;

wherein evaluating the overall fitness of the avatars using a fitness function includes calculating fitness values for individual facial elements of the avatars based on linear and geometric weights corresponding to each of the individual facial elements.]

[2. The method of claim 1, where determining digital representations of facial elements of the individual, further comprises:

image processing the input images to identify the individual's facial elements; and generating binary masks or images for the identified facial elements.]

[3. The method of claim 1, where the digital representations of the corresponding avatar facial elements are binary masks.]

[4. The method of claim 1, further comprising:

initializing the genetic process by randomly generating a population of avatars having the facial elements.]

[5. The method of claim 1, further comprising:

initializing the genetic process by seeding the avatar population with avatars having the facial elements.]

[6. The method of claim 1, where evaluating the overall fitness of the avatars using a fitness function, further comprises: calculating the overall fitness values for the avatars based on the individual fitness values.]

[7. The method of claim 6, where the overall fitness function is given by $$f = \sum_i \alpha_i \cdot f_i^{\gamma_i},$$

where $\alpha_i$ and $\gamma_i$ are linear and geometric weights for each facial element fitness value $f_i^{\gamma_i}$, respectively, and i is an index into the facial elements.]

[8. The method of claim 1, where the facial elements are from a group of facial elements including face, eyebrows, eyes, nose, mouth, chin and hair.]

[9. The method of claim 1, further comprising:

preprocessing the input images using one or more of the following processes: resizing, color space conversion, inverted square root y channel, fine texture, cartoon texture and face detection.]

[10. The method of claim 1, further comprising:

presenting the selected one or more avatars on a touch sensitive display; and receiving input from the touch sensitive display selecting an avatar.]

[11. A system, comprising:

a processor; and a computer-readable storage medium coupled to the processor and including instructions, which, when executed by the processor, causes the processor to perform operations comprising:

receiving one or more digital images of an individual;

determining, in a computer, digital representations of facial elements of the individual from the one or more digital images;

searching a population of avatars using a genetic process, where the genetic process includes using the computer to evaluate the overall fitness of the avatars using a fitness function that compares the digital representations of the individual's facial elements to digital representations of corresponding avatar facial elements; and selecting or receiving a selection of one or more avatars from the population of avatars based on fitness values associated with the avatars;

wherein evaluating the overall fitness of the avatars using a fitness function includes calculating fitness values for individual facial elements of the avatars based on linear and geometric weights corresponding to each of the individual facial elements.]

[12. The system of claim 11, where determining digital representations of facial elements of the individual, further comprises:

image processing the input images to identify the individual's facial elements; and generating binary masks or images for the identified facial elements.]

[13. The system of claim 11, where the digital representations of the corresponding avatar facial elements are binary masks.]

[14. The system of claim 11, where evaluating the overall fitness of the avatars using a fitness function, further comprises: calculating the overall fitness values for the avatars based on the individual fitness values.]

[15. The system of claim 11, further comprising:

preprocessing the input images using one or more of the following processes: resizing, color space conversion, inverted square root y channel, fine texture, cartoon texture and face detection.]

[16. The system of claim 11, further comprising:

presenting the selected one or more avatars on a touch sensitive display; and receiving input from the touch sensitive display selecting an avatar.]

[17. A non-transitory computer-readable storage medium having instructions stored thereon, which, when executed by one or more processors, causes the one or more processors to perform operations comprising:

receiving one or more digital images of an individual;

determining, in a computer, digital representations of facial elements of the individual from the one or more digital images;

searching a population of avatars using a genetic process, where the genetic process includes using the computer to evaluate the overall fitness of the avatars using a fitness function that compares the digital representations of the individual's facial elements to digital representations of corresponding avatar facial elements; and selecting or receiving a selection of one or more avatars from the population of avatars based on fitness values associated with the avatars;

wherein evaluating the overall fitness of the avatars using a fitness function includes calculating fitness values for individual facial elements of the avatars based on linear and geometric weights corresponding to each of the individual facial elements.]

[18. The non-transitory computer-readable storage medium of claim 17, where determining digital representations of facial elements of the individual, further comprises:

image processing the input images to identify the individual's facial elements; and generating binary masks or images for the identified facial elements.]

[19. The non-transitory computer-readable storage medium of claim 17, where the digital representations of the corresponding avatar facial elements are binary masks.]

[20. The non-transitory computer-readable storage medium of claim 17, where evaluating the overall fitness of the avatars using a fitness function, further comprises: calculating the overall fitness values for the avatars based on the individual fitness values.]

*21. A method, comprising:*

*at an electronic device with a display, a camera, and one or more input devices:*

*displaying, on the display, a first user interface that provides information about generation, by the electronic device, of an avatar of a user of the electronic device;*

*while displaying the first user interface, receiving, via the one or more input devices, a request to initiate the generation of the avatar based on a digital representation of the user of the electronic device that is being captured by the camera of the electronic device;*

*in response to receiving the request to initiate the generation of the avatar, while capturing the digital representation of the user, displaying, on the display, a second user interface that includes:*

*the digital representation of the user as it is being captured by the camera of the electronic device, and*

*a visual indication of a current status of evaluating the digital representation of the user of the electronic device that is being captured by the camera of the electronic device, wherein:*

*the visual indication is overlaid on the digital representation of the user as the digital representation of the user is being evaluated, and*

*the visual indication moves from being overlaid on a first portion of the digital representation of the user corresponding to a first facial element to being overlaid on a second portion, different from the first portion, of the digital representation of the user corresponding to a second facial element, different from the first facial element, as the digital representation of the user is being evaluated;*

*after displaying the second user interface, displaying, on the display, a first proposed avatar based on the digital representation of the user; and*

*while displaying the first proposed avatar, providing the user with options for customizing the first proposed avatar.*

*22. The method of claim 21, further comprising:*

*after displaying the second user interface, concurrently displaying, on the display, the first proposed avatar and a second proposed avatar based on the digital representation of the user.*

*23. The method of claim 22, further comprising:*

*while concurrently displaying the first proposed avatar and the second proposed avatar on the display, receiving, via the one or more input devices, an input corresponding to a selection of a respective proposed avatar of the first and second proposed avatars; and*

*in response to receiving the input, entering a manual editing mode on the electronic device for manually editing the respective proposed avatar.*

*24. The method of claim 21, wherein displaying the second user interface includes displaying dynamic feedback for guiding a position of the user that will improve an accuracy of the avatar that is being generated by the electronic device, and the feedback for guiding the position of the user comprises feedback for constraining the position of the user.*

*25. The method of claim 24, wherein the feedback for constraining the position of the user comprises feedback for constraining a position of the user's head while the camera captures successive images of the user.*

*26. The method of claim 21, further comprising:*

*while displaying the first proposed avatar on the display, receiving, via the one or more input devices, a touch input from the user with respect to the first proposed avatar; and*

*in response to receiving the touch input, performing a corresponding action on the electronic device with respect to the first proposed avatar.*

*27. The method of claim 26, wherein the touch input with respect to the first proposed avatar comprises touching of the first proposed avatar on the display.*

*28. The method of claim 26, wherein the corresponding action comprises changing a display characteristic of the first proposed avatar on the display.*

*29. The method of claim 28, wherein changing the display characteristic of the first proposed avatar on the display comprises enlarging the first proposed avatar on the display.*

*30. The method of claim 21, wherein the visual indication of the current status indicates a respective portion of the user currently being evaluated.*

*31. The method of claim 21, wherein the second user interface includes a latest candidate avatar of the user, overlaid on the digital representation of the user as it is being captured by the camera, based on a current progress of the evaluation of the digital representation of the user.*

*32. A non-transitory computer-readable medium storing instructions, which when executed by one or more processors of an electronic device with a display, a camera, and one or more input devices, cause the one or more processors to perform a method comprising:*

*displaying, on the display, a first user interface that provides information about generation, by the electronic device, of an avatar of a user of the electronic device;*

*while displaying the first user interface, receiving, via the one or more input devices, a request to initiate the generation of the avatar based on a digital representation of the user of the electronic device that is being captured by the camera of the electronic device;*

*in response to receiving the request to initiate the generation of the avatar, while capturing the digital representation of the user, displaying, on the display, a second user interface that includes:*

*the digital representation of the user as it is being captured by the camera of the electronic device, and*

*a visual indication of a current status of evaluating the digital representation of the user of the electronic device that is being captured by the camera of the electronic device, wherein:*

*the visual indication is overlaid on the digital representation of the user as the digital representation of the user is being evaluated, and*

*the visual indication moves from being overlaid on a first portion of the digital representation of the user corresponding to a first facial element to being overlaid on a second portion, different from the first portion, of the digital representation of the user corresponding to a second facial element, different from the first facial element, as the digital representation of the user is being evaluated;*

*after displaying the second user interface, displaying, on the display, a first proposed avatar based on the digital representation of the user; and*

*while displaying the first proposed avatar, providing the user with options for customizing the first proposed avatar.*

*33. The non-transitory computer-readable medium of claim 32, the method further comprising:*

*after displaying the second user interface, concurrently displaying, on the display, the first proposed avatar and a second proposed avatar based on the digital representation of the user.*

*34. The non-transitory computer-readable medium of claim 33, the method further comprising:*

*while concurrently displaying the first proposed avatar and the second proposed avatar on the display, receiving, via the one or more input devices, an input corresponding to a selection of a respective proposed avatar of the first and second proposed avatars; and*

*in response to receiving the input, entering a manual editing mode on the electronic device for manually editing the respective proposed avatar.*

*35. The non-transitory computer-readable medium of claim 32, wherein displaying the second user interface includes displaying dynamic feedback for guiding a position of the user that will improve an accuracy of the avatar that is being generated by the electronic device, and the feedback for guiding the position of the user comprises feedback for constraining the position of the user.*

*36. The non-transitory computer-readable medium of claim 35, wherein the feedback for constraining the position of the user comprises feedback for constraining a position of the user's head while the camera captures successive images of the user.*

*37. The non-transitory computer-readable medium of claim 32, the method further comprising:*

*while displaying the first proposed avatar on the display, receiving, via the one or more input devices, a touch input from the user with respect to the first proposed avatar; and*

*in response to receiving the touch input, performing a corresponding action on the electronic device with respect to the first proposed avatar.*

*38. The non-transitory computer-readable medium of claim 37, wherein the touch input with respect to the first proposed avatar comprises touching of the first proposed avatar on the display.*

*39. The non-transitory computer-readable medium of claim 37, wherein the corresponding action comprises changing a display characteristic of the first proposed avatar on the display.*

*40. The non-transitory computer-readable medium of claim 39, wherein changing the display characteristic of the first proposed avatar on the display comprises enlarging the first proposed avatar on the display.*

*41. The non-transitory computer-readable medium of claim 32, wherein the visual indication of the current status indicates a respective portion of the user currently being evaluated.*

*42. The non-transitory computer-readable medium of claim 32, wherein the second user interface includes a latest candidate avatar of the user, overlaid on the digital representation of the user as it is being captured by the camera, based on a current progress of the evaluation of the digital representation of the user.*

*43. An electronic device comprising:*

*one or more processors;*

*a display;*

*a camera;*

*one or more input devices; and*

*memory storing instructions, which when executed by the one or more processors, cause the one or more processors to perform a method comprising:*

*displaying, on the display, a first user interface that provides information about generation, by the electronic device, of an avatar of a user of the electronic device;*

*while displaying the first user interface, receiving, via the one or more input devices, a request to initiate the generation of the avatar based on a digital representation of the user of the electronic device that is being captured by the camera of the electronic device;*

*in response to receiving the request to initiate the generation of the avatar, while capturing the digital representation of the user, displaying, on the display, a second user interface that includes:*

*the digital representation of the user as it is being captured by the camera of the electronic device, and*

*a visual indication of a current status of evaluating the digital representation of the user of the electronic device that is being captured by the camera of the electronic device, wherein:*

*the visual indication is overlaid on the digital representation of the user as the digital representation of the user is being evaluated, and*

*the visual indication moves from being overlaid on a first portion of the digital representation of the user corresponding to a first facial element to being overlaid on a second portion, different from the first portion, of the digital representation of the user corresponding to a second facial element, different from the first facial element, as the digital representation of the user is being evaluated;*

*after displaying the second user interface, displaying, on the display, a first proposed avatar based on the digital representation of the user; and*

*while displaying the first proposed avatar, providing the user with options for customizing the first proposed avatar.*

*44. The electronic device of claim 43, the method further comprising:*

*after displaying the second user interface, concurrently displaying, on the display, the first proposed avatar and a second proposed avatar based on the digital representation of the user.*

*45. The electronic device of claim 44, the method further comprising:*

*while concurrently displaying the first proposed avatar and the second proposed avatar on the display, receiving, via the one or more input devices, an input corresponding to a selection of a respective proposed avatar of the first and second proposed avatars; and*

*in response to receiving the input, entering a manual editing mode on the electronic device for manually editing the respective proposed avatar.*

*46. The electronic device of claim 43, wherein displaying the second user interface includes displaying dynamic feedback for guiding a position of the user that will improve an accuracy of the avatar that is being generated by the electronic device, and the feedback for guiding the position of the user comprises feedback for constraining the position of the user.*

*47. The electronic device of claim 46, wherein the feedback for constraining the position of the user comprises feedback for constraining a position of the user's head while the camera captures successive images of the user.*

*48. The electronic device of claim 43, the method further comprising:*

*while displaying the first proposed avatar on the display, receiving, via the one or more input devices, a touch input from the user with respect to the first proposed avatar; and*

*in response to receiving the touch input, performing a corresponding action on the electronic device with respect to the first proposed avatar.*

*49. The electronic device of claim 48, wherein the touch input with respect to the first proposed avatar comprises touching of the first proposed avatar on the display.*

*50. The electronic device of claim 48, wherein the corresponding action comprises changing a display characteristic of the first proposed avatar on the display.*

*51. The electronic device of claim 50, wherein changing the display characteristic of the first proposed avatar on the display comprises enlarging the first proposed avatar on the display.*

*52. The electronic device of claim 43, wherein the visual indication of the current status indicates a respective portion of the user currently being evaluated.*

*53. The electronic device of claim 43, wherein the second user interface includes a latest candidate avatar of the user, overlaid on the digital representation of the user as it is being captured by the camera, based on a current progress of the evaluation of the digital representation of the user.*

* * * * *